United States Patent [19]

Cressoni

[11] Patent Number: 4,818,008
[45] Date of Patent: Apr. 4, 1989

[54] CONSOLE WITH CONTROLS AND SERVICES FOR A MOTOR CAR

[75] Inventor: Ermanno Cressoni, Arese, Italy

[73] Assignee: Alfa Romeo Auto S.p.A., Naples, Italy

[21] Appl. No.: 754,447

[22] Filed: Jul. 12, 1985

[30] Foreign Application Priority Data

Jul. 16, 1984 [IT] Italy ................. 22586/84[U]

[51] Int. Cl.$^4$ ............. B60R 7/04; B60T 7/10
[52] U.S. Cl. .................. 296/37.8; 224/42.42; 74/491; 74/523
[58] Field of Search ............. 296/37.1, 37.8, 37.12, 296/24 R; 224/275, 42.11, 42.42, 278; 220/330, 334, 348; 180/315, 334; 74/491, 523; 160/206, 213; D12/179; 16/225; 192/4 A

[56] References Cited

U.S. PATENT DOCUMENTS

| D. 216,780 | 3/1970 | Tronville et al. | D12/179 |
|---|---|---|---|
| 2,014,591 | 9/1935 | Sanders | 160/206 |
| 2,187,665 | 1/1940 | Scates | 74/491 |
| 2,263,426 | 11/1941 | Macauley | 224/278 |
| 2,585,645 | 2/1952 | Freitag | 160/206 |
| 3,177,033 | 4/1965 | Daniels | 296/37.8 |
| 3,356,409 | 12/1967 | Belsky et al. | 296/24 R |
| 3,388,420 | 6/1968 | Ballantyne | 16/225 |
| 3,428,357 | 2/1969 | Lueck | 296/24 R |
| 3,990,322 | 11/1976 | Hoffman | D12/179 X |
| 4,075,707 | 2/1978 | Petrzelka | 74/523 |
| 4,202,030 | 5/1980 | Kimura | 362/61 |
| 4,212,367 | 7/1980 | Kawaguchi | 74/491 |
| 4,256,340 | 3/1981 | Dunchock | 296/24 R |
| 4,453,759 | 6/1984 | Kathiria | 296/37.8 |
| 4,548,093 | 10/1985 | Nomura et al. | 296/37.8 |

FOREIGN PATENT DOCUMENTS

| 2546111 | 4/1977 | Fed. Rep. of Germany | 74/523 |
|---|---|---|---|
| 2708993 | 9/1978 | Fed. Rep. of Germany | 74/523 |
| 3143951 | 5/1983 | Fed. Rep. of Germany | 74/523 |
| 164821 | 10/1982 | Japan | 224/42.42 |
| 180339 | 10/1983 | Japan | 296/37.8 |

Primary Examiner—Dennis H. Pedder
Attorney, Agent, or Firm—Charles E. Brown; Charles A. Brown

[57] ABSTRACT

The console, intended for housing certain controls and services on board a motor car, can be fastened on to the floor of the motor car in the region situated between the two front seats, and is essentially constituted by a box, suitable to serve as a glove box and provided in its upper part with a lid which in its closed position allows the box to act as an armrest for the occupants of the front seats of the motor car. The lid is composed by two plate-shaped portions hinged to each other, one of such portion being also hinged on the box, and the other one being guided along an edge of the box. Sideways to the box two arms of a "U"-lever, constituting a motor car parking brake, are movable.

11 Claims, 2 Drawing Sheets

CONSOLE WITH CONTROLS AND SERVICES FOR A MOTOR CAR

The present invention relates to a console which incorporates and encloses within a single unit, certain motor car controls and services provided on board a motor car.

The importance is known of the positioning of the controls and of the services on board of a motor car in general, the selection of the positioning has mainly the purpose of allowing the maximum accessibility and the best use conditions for the actuation and the use thereof by the occupants of the same motor car.

In many cases, others have tried to combine in a single unit a certain number of motor car controls and services to make the use of the controls and services easier due to the location thereof at the time of use, and to make it possible to have subassemblies available, which make simpler and quicker the assemblage of the unit in a motor car.

The purpose of the present invention is to provide a console which is compact and easy to be installed, which incorporates a certain number of motor car controls and of services desired on board a motor cars, and which improves the travelling comfort of the occupants of the front seats of the motor car.

In order to achieve this purpose, a console is provided, which can be fastened on to the floor of the motor car, in the region situated between the front seats, with the console having at least a box acting as a glove box, and which glove box is provided with a movable lid, which, in its closure position, allows the same glove box to act as an armrest for the occupants of the motor car front seats. Inside the same console can be assembled other services or accessories, such as the guard to be positioned around the gearbox lever, an ashtray, and an electric lighter.

Advantageously, sideways to longitudinal walls of the glove box the arms of a "U"-shaped lever for the actuation of the parking brake may be movable, such arms being pivoted at their free ends on to the floor of the motor car.

Characteristics and advantages of the present invention shall be now illustrated with reference to the attached drawings, wherein a preferred embodiment of the same invention is represented to exemplifying and non-limitative purposes.

Figure 1:
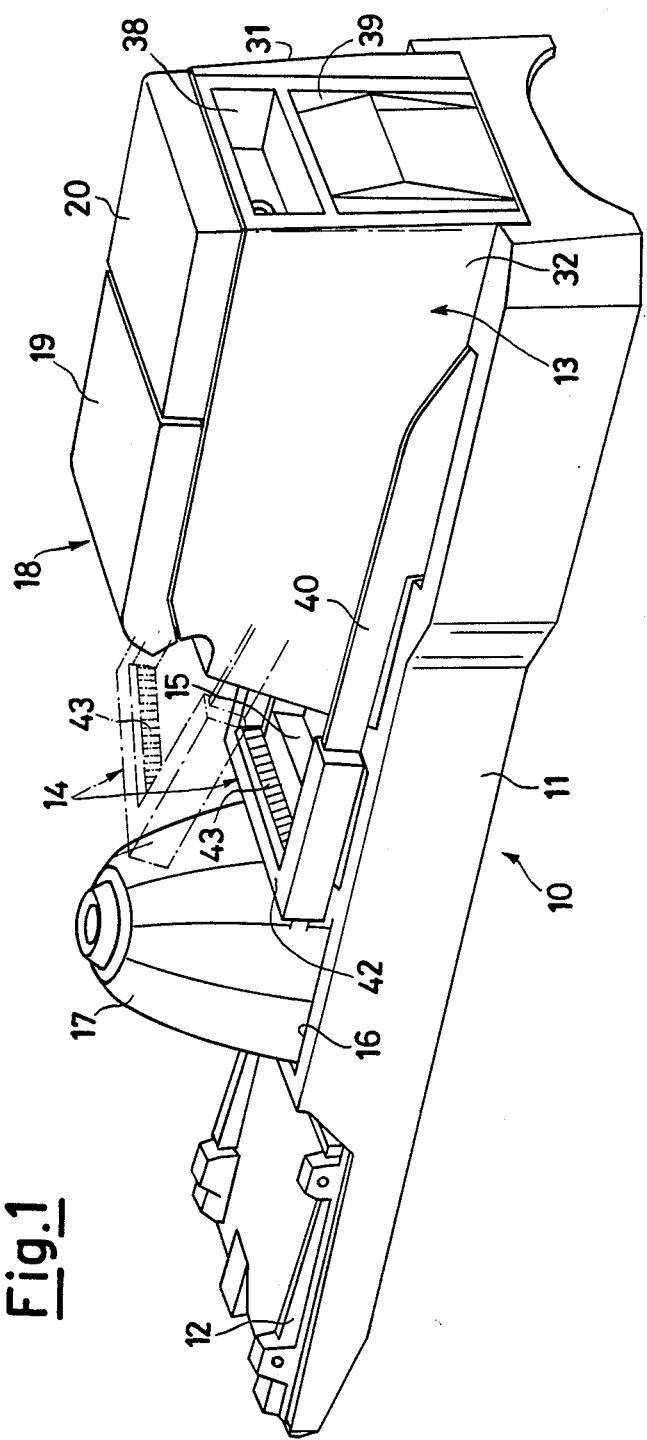
FIG. 1 is a perspective view of the console according to the invention.

In FIG. 1 there is illustrated a console, generally indicated by the numeral 10, to be placed between the front seats of a motor car. The console is formed by a longitudinally elongated base 11, by means of which the console can be fastened on to the floor, not shown, of the motor car.

The base 11 is provided with a bracket 12 which is to be secured to the dashboard, not shown, of the motor car. On the base 11, a longitudinally elongated glove box 13 and a lever 14 for the actuation of the parking brake are removably mounted. The same base 11 is provided with an object-holder tray 15 and with a cavity 16 for housing the customary protective guard 17 for the gearbox lever, not shown.

Figure 2:
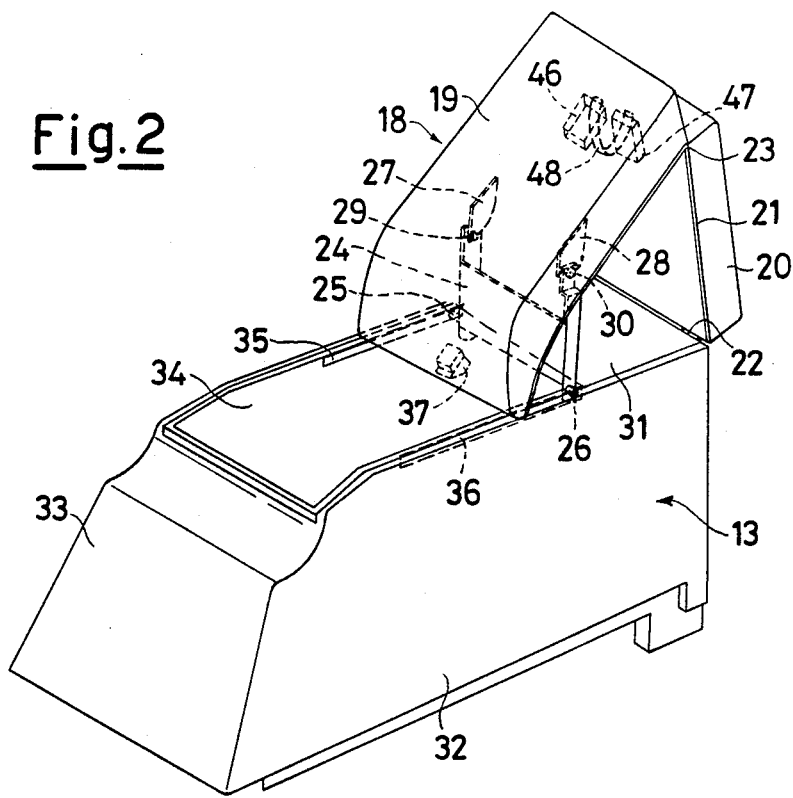
FIG. 2 is a view, always in perspective, of a component of the console of FIG. 1.

The glove box 13 is provided with a longitudinally movable lid 18 formed by two plates 19 and 20 of semi-rigid material, such as polyurethane foam, linked to each other by a sheet of plastic material 21, which, has foldings which form two hinges 22 and 23 of the so-called "film-type", as shown in FIG. 2.

The sheet of plastic material 21 is fastened on to the rear wall 31 of the box 13 along its edge close to the hinge 22, which constitutes the constraint linking the lid 18 to the box 13.

Within suitable cavities 46 and 47 formed inside the two plates 19 and 20, adjacent the hinge 23, a semicircular flat spring 48 of the load-reversing type, is provided, as shown by dotted lines in FIG. 2. When the spring 48 is extended, it tends to space apart the two plates 19 and 20, while when the spring 48 is compressed beyond a certain threshold value, it tends to bring nearer the plates 19 and 20, as shown in FIG. 2.

The plate 19 is constrained for sliding relative to the glove box 13 by means of a bracket 24. The plate 19 is provided with two lugs 27 and 28, within which two pivot pins 29 and 30 are rotatably journalled, the pins 29 and 30 being solid with the bracket 24. The bracket is also provided with two further pins 25 and 26 which slide inside guide slots 35 and 36 provided in the nearby of the upper inner edge of the side walls 32 and 34 of the box 13.

The plate 19 is also provided with a hook 37 which, by being inserted inside a suitable housing (not shown) provided in the front wall 33, allows the lid 18 to be snap-closed.

In the outer face of the rear wall 31 of the glove box 13 two cavities 38 and 39 are provided, in order to house respectively an electrical lighter and an ashtray, as shown in FIG. 1.

Figure 3:
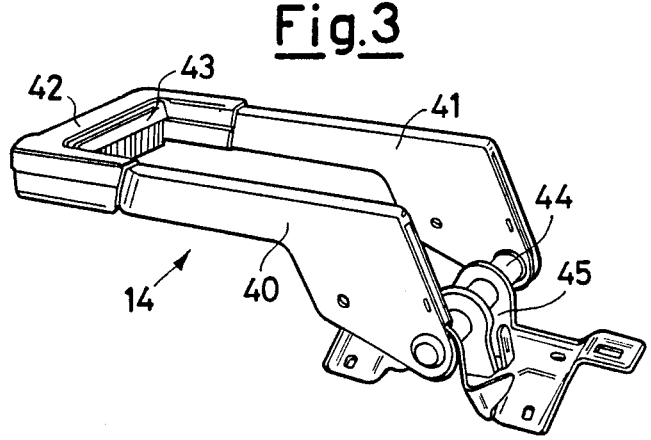
FIG. 3 is a perspective view of another component of the same console.

The lever 14 for the actuation of the parking brake has a "U"-shape, with two longitudinally extending lateral arms 40 and 41, connected by a gripping handle 42, as it can be easily seen in FIG. 3. The guard 17 is in front of the handle 42.

The handle 42 is provided with a pushbutton 43 for the jamming and the release of the mechanism of the parking brake, not shown.

The lever 14 is provided with a pivot pin 44 and, by means of a bracket 45, it is to be bolted on to the floor of the motor car, after the brake lever has been mounted in the base 11 of the console.

The glove box 13 is mounted on the periphery of the base 11 after the lever 14 has been coupled, with the two arms 40 and 41 being placed adjacent the sidewalls of the glove box.

It will be obvious to one skilled in the art that the lever 14 must clear the glove box 13 in all operative positions of the lever. It will also be obvious that the mounting of the glove box 13 should be one wherein the glove box is removable from the base 11 in that the glove box 13 is a part separate from the base 11 as is shown in FIG. 2.

The glove box 13, with the lid 18 being closed, may serve as an armrest of the occupants of the front seats of the motor car.

When the glove box is to be used, the lid 18 is open, by lifting the plate 20, which in its turn drags the plate 19, lifting it and causing it to slide inside the guides 35 and 36, with a guided movement.

When the two plates 19 and 20 approach each other beyond a certain threshold angle, the load-inverting spring 48 acts so as to move the plates 19 and 20 into close contact with each other.

The lid 18 can be subsequently brought back into its closure position by a pulling action on the plate 19.

A console is thus provided which combines, in a very compact unit, a certain number of motor car controls and services to be provided on board a motor car.

I claim:

1. A console for use with a motor car having a floor, transversely spaced apart front seats and a dashboard, said console comprising a longitudinally elongated base forming means for attaching said console to a motor car floor between the front seats and in a fixed position, a glove box seated on a rear portion of said base, a U-shaped parking brake lever including a pair of longitudinally extending arms having forward ends joined by a transverse handle, said arms having rear ends carried by pivot means, said pivot means having mounting means for securement to a motor car floor within the confines of said base directly under said glove box, said rear ends of said arms being positioned generally within said base and generally outside the confines of said glove box with the position of said brake lever relative to said glove box being one wherein said transverse handle of said brake lever clears the glove box in all pivotal operative positions of said brake lever.

2. A console according to claim 1 wherein said glove box is a part separate from said base.

3. A console according to claim 1 wherein said lever straddles said glove box and said lever handle overlies said base in front of said glove box.

4. A console according to claim 3 wherein said base has an object tray between said handle and said glove box.

5. A console according to claim 3 wherein said base has an opening means for a gear shift lever guard in front of said handle.

6. A console according to claim 5 wherein said base has a front end portion carrying securing means for attaching said base to an under portion of a motor car dashboard.

7. A console according to claim 6 wherein said base has an object tray between said handle and said glove box.

8. A console according to claim 1 wherein said glove box has a rear wall, and said rear wall carries housings for an electrical lighter and an ashtray.

9. A console according to claim 1 wherein said glove box is longitudinally elongated and has an open top, a longitudinally movable lid carried by said glove box and normally closing said glove box open top, said lid in its closed position forming armrest means.

10. A console according to claim 9 wherein said lid includes two plates disposed in spaced end-to-end relation, a sheet of plastic material underlying and being secured to said plates, that portion of said sheet disposed between said spaced ends of said plates forming an integral hinge between said plates.

11. A console according to claim 10 wherein there are elastic means extending between said plates and bridging said hinge, said elastic means forming means for in an open position of said lid drawing said plates together.

* * * * *